(12) United States Patent
Asplund

(10) Patent No.: US 8,611,113 B2
(45) Date of Patent: Dec. 17, 2013

(54) FAULT PROTECTION IN VOLTAGE SOURCE CONVERTERS WITH REDUNDANT SWITCHING CELLS VIA MECHANICAL SWITCHES BEING CLOSED PYROTECHNICALLY

(75) Inventor: Gunnar Asplund, Solna (SE)

(73) Assignee: ABB Technology AG, Zurich (CH)

( * ) Notice: Subject to any disclaimer, the term of this patent is extended or adjusted under 35 U.S.C. 154(b) by 355 days.

(21) Appl. No.: 13/144,649

(22) PCT Filed: Jan. 16, 2009

(86) PCT No.: PCT/EP2009/050489
§ 371 (c)(1),
(2), (4) Date: Jul. 14, 2011

(87) PCT Pub. No.: WO2010/081555
PCT Pub. Date: Jul. 22, 2010

(65) Prior Publication Data
US 2011/0267852 A1 Nov. 3, 2011

(51) Int. Cl.
*H02M 1/32* (2007.01)
(52) U.S. Cl.
USPC ............... 363/50; 363/55; 363/144; 361/18
(58) Field of Classification Search
USPC ............... 363/35, 50–58, 131–139, 144, 147; 361/18, 54, 55
See application file for complete search history.

(56) References Cited

U.S. PATENT DOCUMENTS

| | | | | |
|---|---|---|---|---|
| 5,383,108 A | * | 1/1995 | Okayama | 363/137 |
| 5,796,568 A | * | 8/1998 | Baiatu | 361/106 |
| 5,995,394 A | * | 11/1999 | Svensson et al. | 363/51 |
| 6,075,350 A | * | 6/2000 | Peng | 323/207 |
| 2008/0232145 A1 | | 9/2008 | Hiller et al. | |

FOREIGN PATENT DOCUMENTS

| | | |
|---|---|---|
| DE | 101 03 031 A1 | 7/2002 |
| EP | 1 282 145 A1 | 2/2003 |
| WO | WO 2007/023064 A1 | 3/2007 |

* cited by examiner

*Primary Examiner* — Jessica Han
(74) *Attorney, Agent, or Firm* — Birch, Stewart, Kolasch & Birch, LLP

(57) ABSTRACT

A Voltage Source Converter has a series connection of switching assemblies, in which each switching assembly has an electrically conducting plate member carrying a plurality of semiconductor chips each having at least a semiconductor device of turn-off and a free-wheeling diode connected in parallel therewith. Said chips are connected in parallel with each other by each being connected by at least one individual conductor member to a said plate member of an adjacent switching assembly of said series connection. Each switching assembly has a mechanical switch configured to be open under normal operation of the switching assembly and configured to enable connection of said plate member of the switching assembly to the plate member of an adjacent switching assembly for bypassing said semiconductor chips of the switching assembly to which the mechanical switch belongs in the case of occurrence of a short circuit current through a semiconductor chip of the switching assembly.

20 Claims, 3 Drawing Sheets

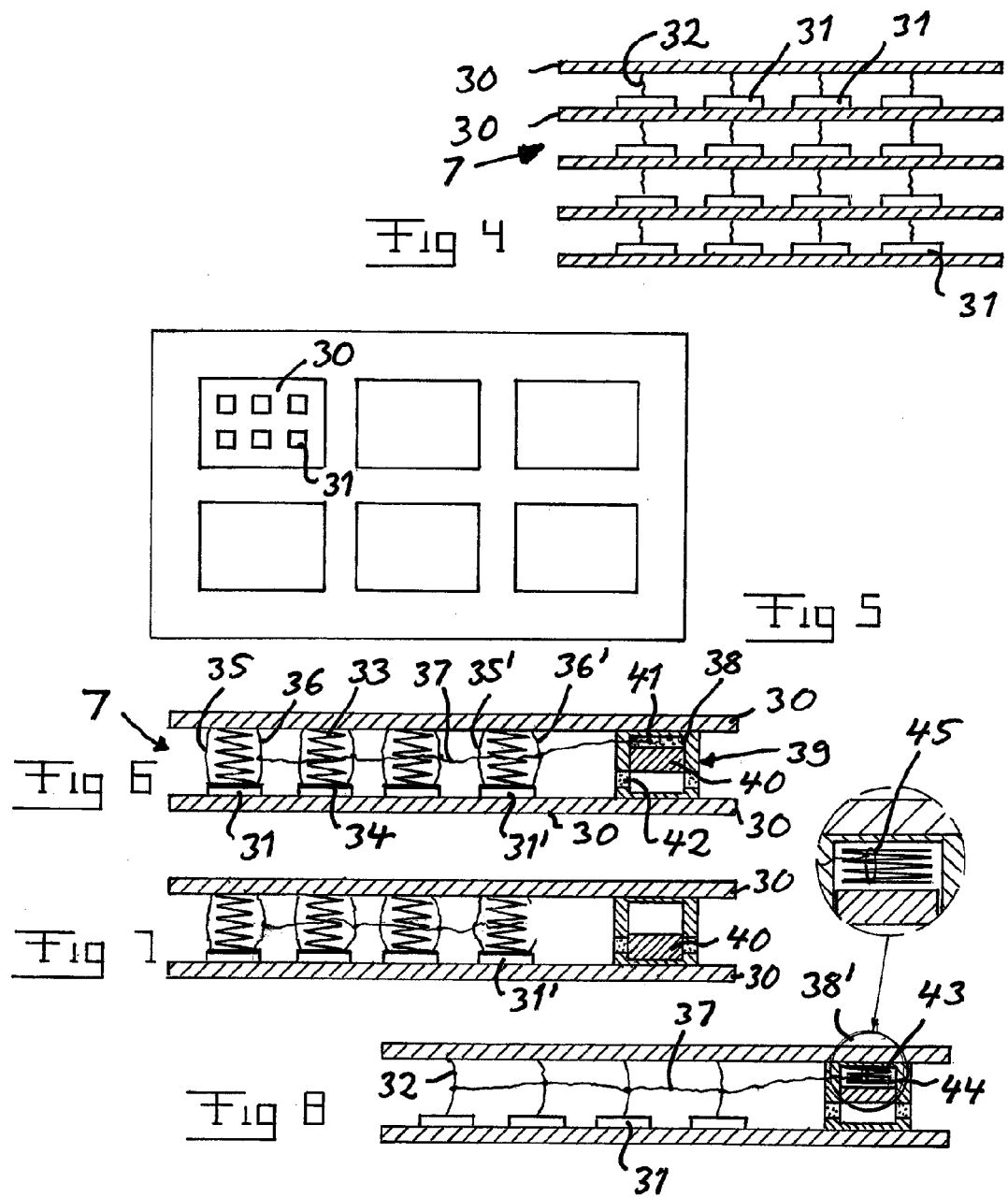

FAULT PROTECTION IN VOLTAGE SOURCE CONVERTERS WITH REDUNDANT SWITCHING CELLS VIA MECHANICAL SWITCHES BEING CLOSED PYROTECHNICALLY

TECHNICAL FIELD OF THE INVENTION AND BACKGROUND ART

The present invention relates to a Voltage Source Converter having at least one phase leg connecting to opposite poles of a direct voltage side of the converter and comprising a series connection of switching assemblies, each switching assembly having an electrically conducting plate member carrying a plurality of semiconductor chips each having at least a semiconductor device of turn-off type and a free-wheeling diode connected in parallel therewith said chips being connected in parallel with each other by each being connected by an individual conductor member to a said plate member of an adjacent switching assembly of said series connection of switching assemblies, a midpoint of said series connection forming a phase output being configured to be connected to an alternating voltage side of the converter and to divide the phase leg into an upper valve branch and a lower valve branch.

Such converters with any number of said phase legs are comprised, but they have normally three such phase legs for having a three phase alternating voltage on the alternating voltage side thereof.

Furthermore, it is pointed out that the present invention is not restricted to any type of Voltage Source Converters, but it comprises for example Voltage Source Converters of the type known through for example DE 101 03 031 A1 and WO 2007/023064 A1, which are normally called multiple-cell converters of M2LCs, as well as two-level converters having current valves controlled for alternatively connecting one of said poles to said phase output and NPC (Neutral Point Clamped) converters.

A Voltage Source Converter of this type may be used in all kinds of situations, in which direct voltage is to be converted into alternating voltage and conversely, in which examples of such uses are in stations of HVDC-plants (High Voltage Direct Current), in which direct voltage is normally converted into a three-phase alternating voltage or conversely, or in so-called back-to-back-stations in which alternating voltage is firstly converted into direct voltage and this is then converted into alternating voltage, as well as in SVCs (Static Var Compensator), in which the direct voltage side consists of capacitors hanging freely. However, the present invention is not restricted to these applications, but other applications are also conceivable, such as in different types of drive systems for machines, vehicles etc.

Thus, the present invention is not restricted to any particular voltage levels between said opposite poles of the direct voltage side of the converter, but these levels shall be that high that a comparatively high number of switching assemblies are to be connected in series for making it possible for them to together hold said voltage in a blocking state of said semiconductor devices.

These semiconductor devices are mostly IGBTs, but any type of similar semiconductor device of turn-off type is conceivable. However, for illuminating but not in any way restricting the present invention the case of IGBTs as semiconductor devices in said semiconductor chips will mainly be discussed hereinafter.

A switching assembly in such a Voltage Source Converter has a plurality of said semiconductor chips connected in parallel, the IGBTs of which are controlled simultaneously to be in a conducting or a blocking state and to share the current through the switching assembly when they are in a conducting state. Continued operation of the Voltage Source Converter has to be ensured would one IGBT fail. Extra switching assemblies, i.e. more switching assemblies than are needed for holding the voltage to be held thereby for taking the voltage between said two poles, are in a Voltage Source Converter of this type arranged in said series connection of switching assemblies, so that it would not constitute any problem if one of them would stop function as long as this does not stop the current through the converter.

One type of Voltage Source Converters has said individual conductor members connecting the respective semiconductor chip to a said plate member in the form of bonded wires, and in a case of a short circuit in one IGBT of such a chip all the current through the switching assembly will flow through this chip and the bonded wire connected thereto will burn through and the current will then jump to another semiconductor chip in parallel therewith. When all the semiconductor chips of the switching assembly have been consumed in this way operation of the Voltage Source Converter has to be stopped and the switching assembly failed has to be replaced.

It is also known to ensure the connection between the switching assemblies connected in series by the so-called press pack technique, which means that a compression spring is arranged between a said plate member and each individual semiconductor chip, and said at least one individual conductor member is in that case constituted by relatively thin flexible conductors, which however are designed to withstand a short circuit current flowing through a failing IGBT. However, after some period of time the current path through the IGBT will be interrupted due to temperature constrains thereon and jump to another semiconductor chip connected in parallel therewith. With this type of series connection of the switching assemblies it may take an acceptably long time before all semiconductor chips of a switching assembly have been knocked out and operation of the converter has to be stopped, since the dimensioning of the current allowed through the converter is chosen so that this will take many years.

Would, however, there be a wish to increase the current substantially for increasing the power transferable through the Voltage Source Converter the lifetime of a switching assembly after one IGBT has been short circuited and until a need to stop the operation of the converter occurs may be considerably shortened, and there would in such a case be highly desired to reliably create permanent short circuit across this switching assembly for avoiding the occurrence of a said operation stop.

SUMMARY OF THE INVENTION

The object of the present invention is to provide a Voltage Source Converter of the type defined in the introduction, which is improved in at least some aspect with respect to the ability of handling failures of semiconductor chips thereof compared to such Voltage Source Converters already known.

This object is according to the invention obtained by providing such a Voltage Source Converter, which is characterized in that each said switching assembly has a mechanical switch configured to be open under normal operation of said switching assembly and configured to enable connection of said plate member of this switching assembly to the plate member of an adjacent switching assembly for bypassing said semiconductor chips of the switching assembly to which the mechanical switch belongs, a release mechanism is associated with each said mechanical switch and configured to, when triggered, move a movable contact of said mechanical switch for transferring the switch from an open to a closed state, at least one said conductor member of each switching assembly is designed to burn through upon occurrence of a short circuit current through the semiconductor chip to which this conductor member is connected while creating an arc, and each switching assembly comprises a fuse member associated with said at least one said conductor member, configured to be ignited by a said arc and extending to said release mechanism for triggering thereof upon ignition of said fuse member for establishing a current path between said two adjacent plate members bypassing said semiconductor chips of said switching assembly.

By in this way arranging a mechanical switch that in a closed state thereof will short circuit the switching assembly in question operation of the Voltage Source Converter has not at any time to be stopped as a consequence of any interruption of the current path therethrough as long as the transferring of the mechanical switch into the closed state is made reliable. The reliability is here ensured by the design of said at least one conductor member creating an arc when a short circuit current is flowing therethrough and utilising this arc to ignite said fuse member and by that trigger the release mechanism associated with the mechanical switch. Thus, no special control circuits are needed for the control of the mechanical switch making the operation thereof very robust and reliable.

Thus, the level of a short circuit current through a switching assembly having a semiconductor chip failing will not constitute any problem any longer, so that a Voltage Source Converter of this type may be designed to conduct very high DC-currents, such as in the order of twice as much as otherwise or more, without any necessity of premature operation stops of the converter. More exactly, no thought have to be spent on for how long time a semiconductor device may take a certain short circuit current when the number of the semiconductor devices connected in parallel in each switching assembly is selected, but this number may be determined by solely considering the current to be conducted therethrough during normal operation.

According to an embodiment of the invention a plurality of said conductor members of each semiconductor assembly are designed to burn through upon occurrence of a short circuit current through the relevant semiconductor chip while creating an arc, and said fuse member is associated with a plurality of these conductor members designed to burn through. Although it is in principle only necessary that each semiconductor assembly has one said conductor member designed to burn through upon occurrence of a short circuit current therethrough while creating an arc, it is advantageous to have more such conductor members in each switching assembly, and these may be at least 90% or all of said conductor members according to another embodiment of the invention, since the production of each switching assembly would mostly be more efficient when all semiconductor chips have the same such conductor members. However, it is for that sake not necessary that all conductor members of this type are connected to a said fuse member, but it is only necessary that said mechanical switch is reliably transferred into the closed state before interruption of current through the switching assembly occurs.

According to another embodiment of the invention said at least one conductor member designed to burn through is a wire, preferably a flexible wire, such as a thin bonded wire. Thus, such wires being appropriately designed for forming a said arc upon a short circuit current therethrough may be used, and the type of bonded wires discussed in the introduction may advantageously be used.

According to another embodiment of the invention said release mechanism comprises an explosive medium, such as gun powder, configured to be ignited by said fuse member so as to move said movable contact to a position corresponding to a closed state of the mechanical switch. This constitutes a reliable way of obtaining a very strong force reliably pushing the movable contact in place for transferring the mechanical switch into the closed state.

According to another embodiment of the invention said release mechanism comprises a member storing potential energy and means holding this member under pretention, and said holding means is configured to be released by burning of a said fuse member associated therewith while allowing said potential energy storing member to release potential energy while urging said movable contact to a position corresponding to a closed state of said mechanical switch. This is another reliable option of obtaining a permanent current path bypassing the switching assembly in question, and said potential energy storing member is preferably a spring member, such as a mechanical compression spring.

According to another embodiment of the invention each switching assembly comprises at least one energy storing capacitor connected in parallel with said semiconductor chips thereof, and said switching assembly is configured to obtain two switching states by control of said semiconductor devices of each semiconductor chip, namely a first switching state and a second switching state, in which the voltage across said at least one energy storing capacitor and a zero voltage, respectively, is applied across said plate member of said switching assembly and the plate member to which the semiconductor chips belonging to this switching assembly connect, for obtaining a determined alternating voltage on said phase output. Such a Voltage Source Converter is particularly interesting when high powers are to be transmitted therethrough, which means that the number of switching assemblies connected in series in said phase leg is comparatively high. A high number of such switching assemblies connected in series means that it will be possible to control these switching assemblies to change between said first and second switching state and by that already at said phase output obtain an alternating voltage being very close to a sinusoidal voltage. This may be obtained already by means of substantially lower switching frequencies than typically used in known Voltage Source Converters having fewer possible levels, such as only two or three, of the voltage pulses delivered to said phase output of the converter. This makes it possible to obtain substantially lower losses and also considerably reduces problems of filtering and harmonic currents and radio interferences, so that equipment therefore may be less costly.

However, the present invention also relates to a converter having switching assemblies belonging to the same said valve branch configured to be controlled simultaneously so as to alternatively connect one of said opposite poles to said phase output, which constitutes another embodiment of the invention.

According to another embodiment of the invention said semiconductor devices of the semiconductor chips are IGBTs (Insulated Gate Bipolar Transistor), IGBTs (Integrated Gate Commutated Thyristor) or GTOs (Gate Turn-Off Thyristor), in which the invention is particularly directed to the case of IGBTs.

According to another embodiment of the invention said converter is configured to have said direct voltage side connected to a direct voltage network for transmitting High Voltage Direct Current (HVDC) and the alternating voltage side connected to an alternating voltage phase line belonging to an alternating voltage network. This is due to the high powers normally desired to be transmitted through such a converter a particularly interesting application of a converter of this type.

According to another embodiment of the invention the converter is a part of a SVC (Static Var Compensator) with a direct voltage side formed by energy storing capacitors and the alternating voltage phase output connected to an alternating voltage network.

According to another embodiment of the invention the converter is configured to have a direct voltage across said two poles being 1 kV-1200 kV, 10 kV-1200 kV or 100 kV-1200 kV. The invention is the more interesting the higher the direct voltage is.

According to another embodiment of the invention the converter is configured to conduct a current of 200 A to 10 kA or 1 kA to 7 kA or 2 kA to 5 kA on the direct voltage side thereof. Especially currents above 2 kA are mostly in Voltage Source Converters of this type already known not complying with the existing requirements of operation without stops, but these current levels are well possible to allow in a Voltage Source Converter according to the present invention.

The invention also relates to a plant for transmitting electric power according to the appended claim therefor. The stations of such a plant may be given a high reliability to a competitively low cost.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings:

FIG. 4 is a very simplified view illustrating the principle of connecting switching assemblies in series in a Voltage Source Converter, FIG. 5 is a very simplified view from above of a switching assembly in a Voltage Source Converter, FIG. 6 is a view corresponding to FIG. 4 of a part of a switching assembly in a Voltage Source Converter according to a first embodiment of the present invention in a state of normal operation of this switching assembly, FIG. 7 is a view corresponding to FIG. 6 in a state of bypassing said switching assembly, and FIG. 8 is a view corresponding to FIG. 6 of a switching assembly in a Voltage Source Converter according to a second embodiment of the invention.

DETAILED DESCRIPTION OF EMBODIMENTS OF THE INVENTION

Figure 1:
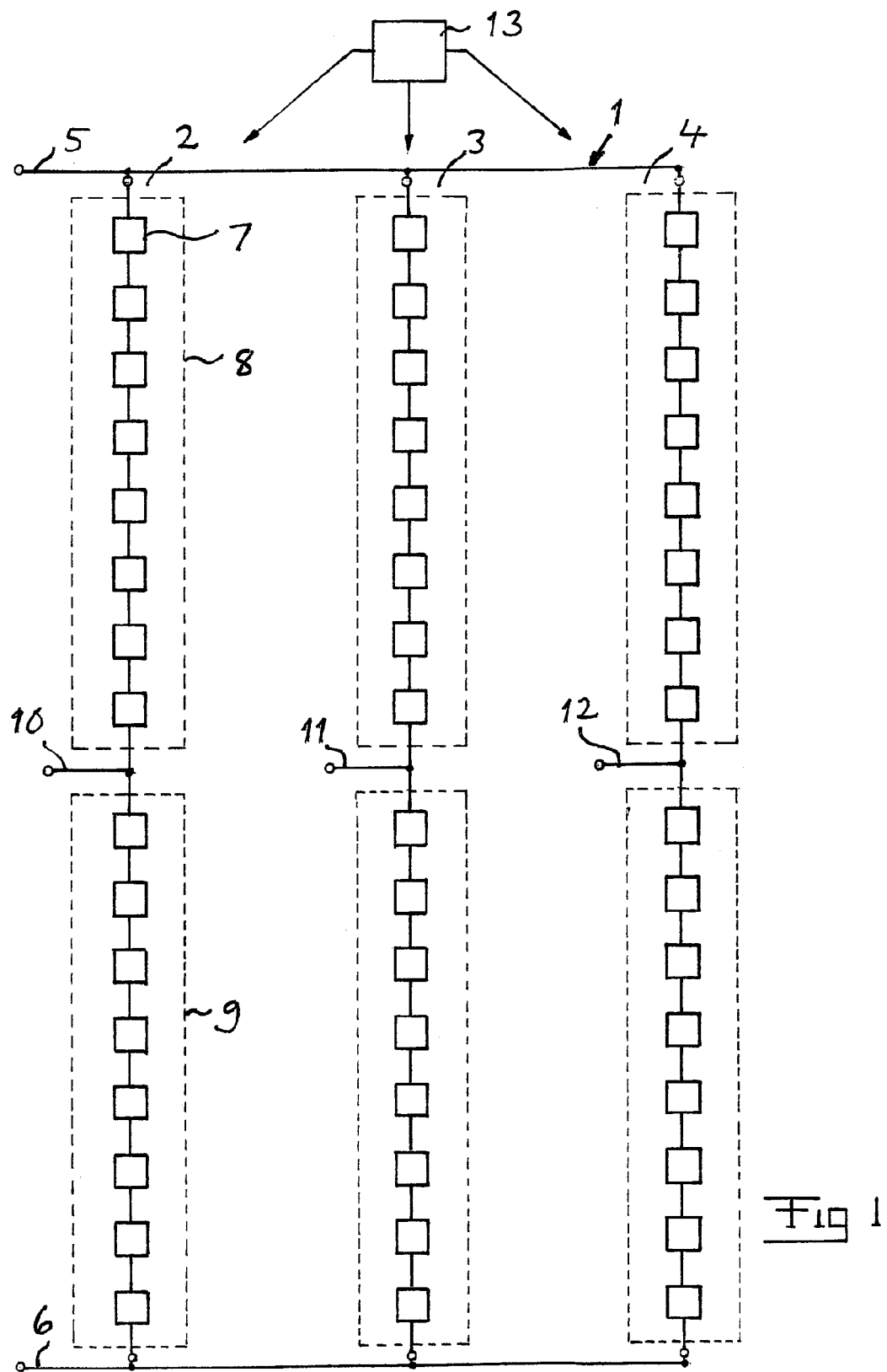
FIG. 1 is a very simplified view of a Voltage Source Converter of the type according to the present invention.

FIG. 1 illustrates very schematically the general construction of a Voltage Source Converter 1 of the type to which the present invention relates. This converter has three phase legs 2-4 connected to opposite poles 5, 6 of a direct voltage side of the converter, such as a direct voltage network for transmitting high voltage direct current. Each phase leg comprises a series connection of switching assemblies 7 indicated by boxes, in the present case 16 to the number, but this number may be much higher, such as 50, and there are some more than required for holding the voltage they have to hold together between said poles. This series connection is divided into two equal parts, an upper valve branch 8 and a lower valve branch 9, separated by a mid point 10-12 forming a phase output being configured to be connected to an alternating voltage side of the converter. The phase outputs 10-12 may possibly through a transformer connect to a three phase alternating voltage network, load, etc. Filtering equipment is also arranged on said alternating voltage side for improving the shape of the alternating voltage on said alternating voltage side.

A control arrangement 13 is arranged for controlling the switching assemblies 7 and by that the converter to convert direct voltage into alternating voltage and conversely.

The Voltage Source Converter has switching assemblies 7 of the type having a plurality of semiconductor chips with each a semiconductor device of turn-off type and a free wheeling diode connected in parallel therewith. These chips are connected in parallel with each other. In a type of VSC shown in FIG. 2 at least one energy storing capacitor, is connected in parallel with the semiconductor chips. The terminals 14, 15 of the switching assemblies are adapted to be connected to adjacent switching assemblies in the series connection of switching assemblies forming a phase leg. The semiconductor devices 16, 17 are in this case IGBTs connected in parallel with diodes 18, 19. An energy storing capacitor 20 is connected in parallel with the respective series connection of the diodes and the semiconductor devices. One terminal 14 is connected to the mid point between the two semiconductor devices as well as the mid point between the two diodes. The other terminal 15 is connected to the energy storing capacitor 20.

Figure 2:
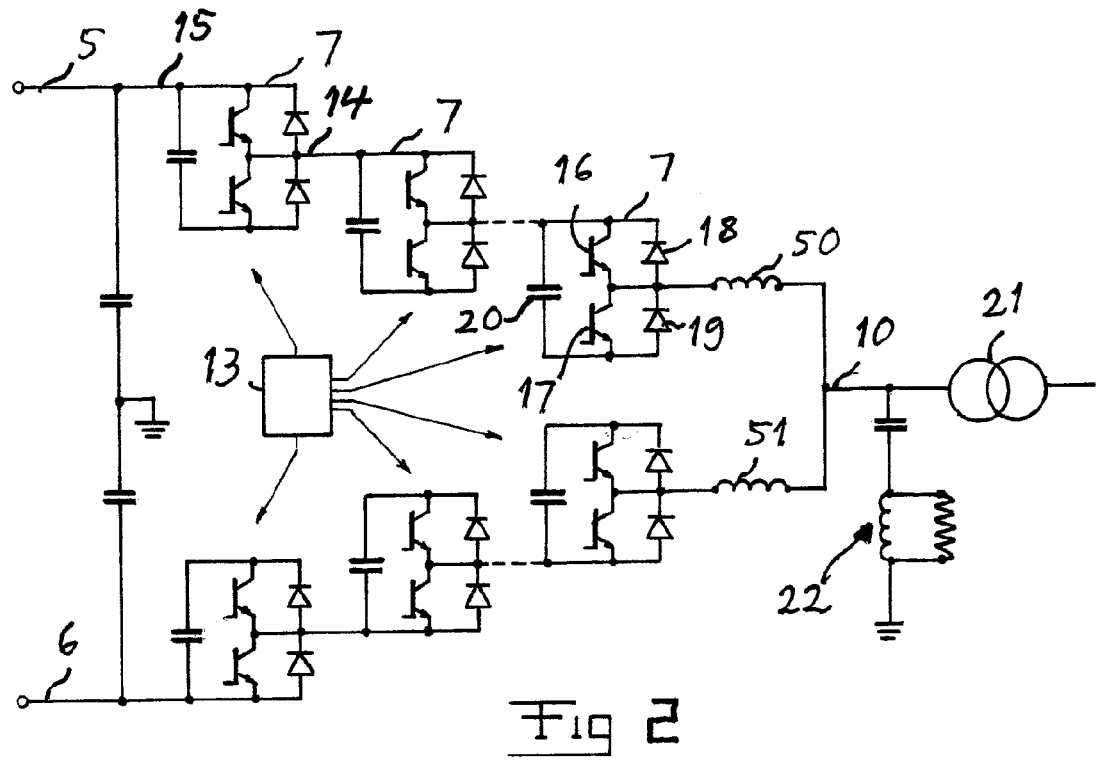
FIG. 2 is a simplified view very schematically illustrating a Voltage Source Converter of a type to which the present invention may be applied.

The switching assemblies shown in FIG. 2 may be controlled to obtain one of a) a first switching state and b) a second switching state, in which for a) the voltage across the capacitor 20 and for b) a zero voltage is applied across the terminals 14, 15.

FIG. 2 shows the converter according to FIG. 1, in which totally ten switching assemblies have been left out for simplifying the drawing. The control arrangement 13 is adapted to control the switching assemblies by controlling the semiconductor devices thereof, so that they will either deliver a zero voltage or the voltage across the capacitor to be added to the voltages of the other switching assemblies in said series connection. A transformer 21 and filtering equipment 22 are here also indicated. It is shown how each valve branch is through a phase reactor 50, 51 connected to the phase output 10, and such phase reactors should also be there in FIG. 1 for the phase outputs 10, 11 and 12, but have there been left out for simplifying the illustration.

Figure 3:
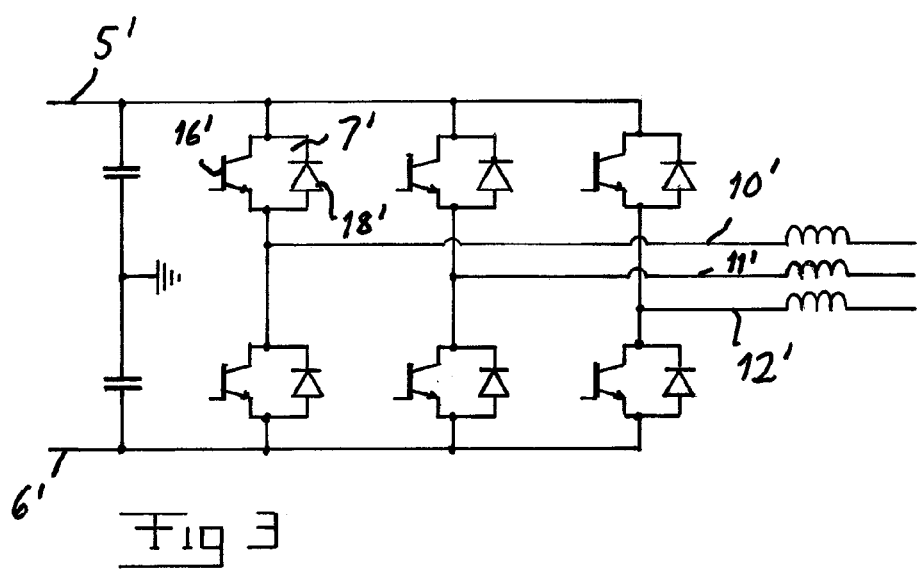
FIG. 3 is a simplified view very schematically illustrating a Voltage Source Converter according to another type to which the present invention may be applied.

FIG. 3 schematically illustrates another type of Voltage Source Converter to which the present invention may apply, which is of a so-called two level type and the switching assemblies 7' belonging to the same valve branch are here for the sake of simplicity summarised by one single current valve. The switching assemblies belonging to the same said valve branch are here configured to be controlled simultaneously so as to alternatively connect one of said of said opposite poles 5, 6 to a respective phase output 10', 11' and 12'.

Reference is now simultaneously made to FIGS. 4 and 5 for explaining the principle of series connection of switching assemblies in a Voltage Source Converter of the type to which the present invention apply. Each switching assembly 7 comprises an electrically conducting plate member 30 carrying a plurality of semiconductor chips 31 each having at least a semiconductor device of turn-off type and a free wheeling diode connected in parallel therewith as indicated in FIGS. 2 and 3. Said chips 31 are connected in parallel with each other by each being connected by an individual conductor member 32 to a said plate member 30 of an adjacent switching assembly of said series connection of switching assemblies. How this connection is realised for ensuring that a permanent short circuit of a switching assembly is obtained when a semiconductor chip, such as an IGBT thereof, of said switching assembly fails and is short circuited is the key issue of the present invention and will now be explained while firstly making reference to FIG. 6 showing this for a Voltage Source Converter according to a first embodiment of the invention. The series connection is here realised by the so-called press pack technique, in which compression springs 33 are forcing a metal plate 34 in contact upon each chip 31 and flexible conductors 35, 36 connects the respective chip to a plate member 30 of an adjacent switching assembly. These conductors 35, 36 are in the embodiment according to the present invention designed to burn through upon occurrence of a short circuit current through the semiconductor chip to which the respective conductor member is connected while creating and arc. This may be accomplished by making them of thin bonded wires. The arc will then be formed, since the current will increase some hundred times and the power in the wires some ten thousand times upon occurrence of such a short circuit. Furthermore, a fuse member 37, such as a pyro fuse member, is associated with the conductor members 35, 36, is configured to be ignited by a said arc and extends to a release mechanism 38 for a mechanical switch 39. This mechanical switch 39 is configured to be open under normal operation of the switching assembly and configured to enable a connection of the plate member 30 thereof to the plate member of an adjacent switching assembly for bypassing the semiconductor chips 31 of the switching assembly to which the mechanical switch belongs.

The release mechanism 38 is for this sake configured to, when triggered, move a movable contact 40 of said mechanical switch for transferring the switch from an opened to a closed state. This is ensured by arranging an explosive medium 41, such as gun powder, in a space of said release mechanism and connect this space to the fuse member 37. Insulating parts for maintaining the mechanical switch in an open state in normal operation of the switching assembly are indicated at 42 in FIG. 6.

How the creation of a permanent current path bypassing a switching assembly in a Voltage Source Converter according to a first embodiment of the invention upon a failure of a semiconductor chip of this switching assembly is obtained will now be explained while making reference to FIGS. 6 and 7. We do now assume that the IGBT of the semiconductor chip 31' fails, which will result in a short circuit current through this semiconductor chip and by that through the wires 35', 36' connected thereto, which will be some hundred times the current normally flowing through these wires, so that an arc will be created. This arc will ignite the fuse member 37, which will burn and in it's turn ignite the gun powder 41 applying a very strong force upon the movable contact 40 of this switch pushing this contact to a position defining a closed state of the mechanical switch, as shown in FIG. 7. The switching assembly having at least one failing semiconductor chip is in this way permanently short circuited by creating a current path between two adjacent plate members 30 in this way. The time between ignition of the pyro fuse member 37 and a firm short circuit could typically be five to ten milliseconds.

FIG. 8 illustrates how the present invention is realised in a Voltage Source Converter of the type described in the introduction with said conductor members in the form of bonded wires 32. An alternative way of realizing the release mechanism is also shown, and this has in this case a compression spring 43 enclosed in a space 44 of the mechanical contact and held by holding means in the form of a wire 45 under pretension while storing potential energy. A fuse member 37 is associated with at least some of the conductors 32 or all of them and extends to the wire 45 of the release mechanism 38'. The behaviour of this switching assembly upon occurrence of a failure of one of the semiconductor chips 31 is apparent and as follows. A short circuit current through such a semiconductor chip will create an arc in a said wire 32, which will ignite the fuse member 37, which will in its turn burn and burn through the wire 45 holding the compression spring 44. This will then force the movable contact 40 into a closed state of the mechanical switch while releasing potential energy and firmly hold the movable contact in this state and by that creating a permanent current path bypassing the semiconductor assembly.

The invention is of course not in any way restricted to the embodiments described above, but many possibilities to modifications thereof will be apparent to a person with ordinary skill in the art without departing from the scope of invention as defined in the appended claims.

The invention claimed is:

1. A Voltage Source Converter having at least one phase leg connecting to opposite poles of a direct voltage side of the converter and comprising a series connection of switching assemblies, each switching assembly having an electrically conducting plate member carrying a plurality of semiconductor chips each having at least a semiconductor device of turn-off type and a free-wheeling diode connected in parallel therewith, said chips being connected in parallel with each other by each being connected by at least one individual conductor member to a said plate member of an adjacent switching assembly of said series connection of switching assemblies, a midpoint of said series connection forming a phase output being configured to be connected to an alternating voltage side of the converter and to divide the phase leg into an upper valve branch and a lower valve branch,
wherein
each said switching assembly has a mechanical switch configured to be open under normal operation of said switching assembly and configured to enable connection of said plate member of this switching assembly to the plate member of an adjacent switching assembly for bypassing said semiconductor chips of the switching assembly to which the mechanical switch belongs,
a release mechanism is associated with each said mechanical switch and configured to, when triggered, move a movable contact of said mechanical switch for transferring the switch from an open to a closed state,
at least one said conductor member of each switching assembly is designed to burn through upon occurrence of a short circuit current through the semiconductor chip to which this conductor member is connected while creating an arc, and
each switching assembly comprises a fuse member associated with said at least one said conductor member, configured to be ignited by a said arc and extending to said release mechanism for triggering thereof upon ignition of said fuse member for establishing a current path between said two adjacent plate members bypassing said semiconductor chips of said switching assembly.

2. A converter according to claim 1, wherein a plurality of said conductor members of each semiconductor assembly are designed to burn through upon occurrence of a short circuit current through the relevant semiconductor chip while creating an arc, and that a said fuse member is associated with a plurality of these conductor members designed to burn through.

3. A converter according to claim 2, wherein at least 90% or all of said conductor members of each semiconductor assembly are designed to burn through upon occurrence of a short circuit current through the relevant semiconductor chip while creating an arc.

4. A converter according to claim 3, wherein said at least one conductor member designed to burn through is a wire, preferably a flexible wire, such as a thin bonded wire.

5. A converter according to claim 3, wherein said release mechanism comprises an explosive medium, such as gun powder, configured to be ignited by said fuse member so as to move said movable contact to a position corresponding to a closed state of the mechanical switch.

6. A converter according to claim 2, wherein said at least one conductor member designed to burn through is a wire, preferably a flexible wire, such as a thin bonded wire.

7. A converter according to claim 2, wherein said release mechanism comprises an explosive medium, such as gun powder, configured to be ignited by said fuse member so as to move said movable contact to a position corresponding to a closed state of the mechanical switch.

8. A converter according to claim 1, wherein said at least one conductor member designed to burn through is a wire, preferably a flexible wire, such as a thin bonded wire.

9. A converter according to claim 8, wherein said release mechanism comprises an explosive medium, such as gun powder, configured to be ignited by said fuse member so as to move said movable contact to a position corresponding to a closed state of the mechanical switch.

10. A converter according to claim 1, wherein said release mechanism comprises an explosive medium, such as gun powder, configured to be ignited by said fuse member so as to move said movable contact to a position corresponding to a closed state of the mechanical switch.

11. A converter according to claim 1, wherein said release mechanism comprises a member storing potential energy and means holding this member under pretention, and that said holding means is configured to be released by burning of a said fuse member associated therewith while allowing said potential energy storing member to release potential energy while urging said movable contact to a position corresponding to a closed state of said mechanical switch.

12. A converter according to claim 11, wherein said potential energy storing member is a spring member, such as a mechanical compression spring.

13. A converter according to claim 1, wherein each switching assembly comprises at least one energy storing capacitor connected in parallel with said semiconductor chips thereof, and that said switching assembly is configured to obtain two switching states by control of said semiconductor devices of each semiconductor chip, namely a first switching state and a second switching state, in which the voltage across said at least one energy storing capacitor and a zero voltage, respectively, is applied across said plate member of said switching assembly and the plate member to which the semiconductor chips belonging to this switching assembly connect, for obtaining a determined alternating voltage on said phase output.

14. A converter according to claim 1, wherein said switching assemblies belonging to the same said valve branch are configured to be controlled simultaneously so as to alternatively connect one of said opposite poles to said phase output.

15. A converter according to claim 1, wherein said semiconductor devices of the semiconductor chips are IGBTs (Insulated Gate Bipolar Transistor).

16. A converter according to claim 1, wherein it is configured to have said direct voltage side connected to a direct voltage network for transmitting High Voltage Direct Current (HVDC) and the alternating voltage side connected to an alternating voltage phase line belonging to an alternating voltage network.

17. A converter according to claim 1, wherein it is a part of a SVC (Static Var Compensator) with a direct voltage side formed by energy storing capacitors and the alternating voltage phase output connected to an alternating voltage network.

18. A converter according to claim 1, wherein it is configured to have a direct voltage across said two poles being 1 kV-200 kV, 10 kV-1200 kV or 100 kV-1200 kV.

19. A converter according to claim 16, wherein it is configured to conduct a current of 200 A to 10 kA or 1 kA to 7 kA or 2 kA to 5 kA on the direct voltage side thereof.

20. A plant for transmitting electric power comprising a direct voltage network and at least one alternating voltage network connected thereto through a station, said station being adapted to perform transmitting of electric power between the direct voltage network and the alternating voltage network and comprises at least one Voltage Source Converter adapted to convert direct voltage into alternating voltage and conversely, wherein that said station of the plant comprises a Voltage Source Converter according to claim 1.

* * * * *